No. 866,247. PATENTED SEPT. 17, 1907.
G. R. WARD.
TRAVELING LADLE CRANE.
APPLICATION FILED JULY 5, 1907.

2 SHEETS—SHEET 1.

Witnesses:
E. A. Jarvis.
F. W. Wright.

Inventor
George R. Ward.
By Emerson R. Newell
his Attorney.

No. 866,247. PATENTED SEPT. 17, 1907.
G. R. WARD.
TRAVELING LADLE CRANE.
APPLICATION FILED JULY 5, 1907.

2 SHEETS—SHEET 2.

Witnesses
C. A. Jarvis
F. W. Wright

Inventor
George R. Ward.
By Emerson R. Newell
his Attorney.

UNITED STATES PATENT OFFICE.

GEORGE R. WARD, OF NEW YORK, N. Y.

TRAVELING LADLE-CRANE.

No. 866,247.  Specification of Letters Patent.  Patented Sept. 17, 1907.

Application filed July 5, 1907. Serial No. 382,255.

*To all whom it may concern:*

Be it known that I, GEORGE R. WARD, a citizen of the United States, residing at New York city, New York, have invented certain new and useful Improvements in Traveling Ladle-Cranes, of which the following is a clear, full, and exact description.

The object of this invention is to simplify and improve the construction of cranes known as traveling ladle cranes, and particularly to provide a construction of simplicity and of economical construction which may have the hoisting chains so disposed as to give convenience of location thereto.

In carrying out the invention I provide the usual side carriages for the main girders which usually are two in number, upon which the main trolley is traversed. I also provide a supplementary girder independent of the main girders secured to the end carriages and carrying a supplementary trolley preferably having wheels arranged in tandem and running on the supplementary girder. This supplementary trolley may be a rectangular frame as viewed from the end, carrying below the girder the hoisting mechanism and above the same shafts for the trolley wheels.

The scope of my invention will be pointed out in the claims.

Figure 1:
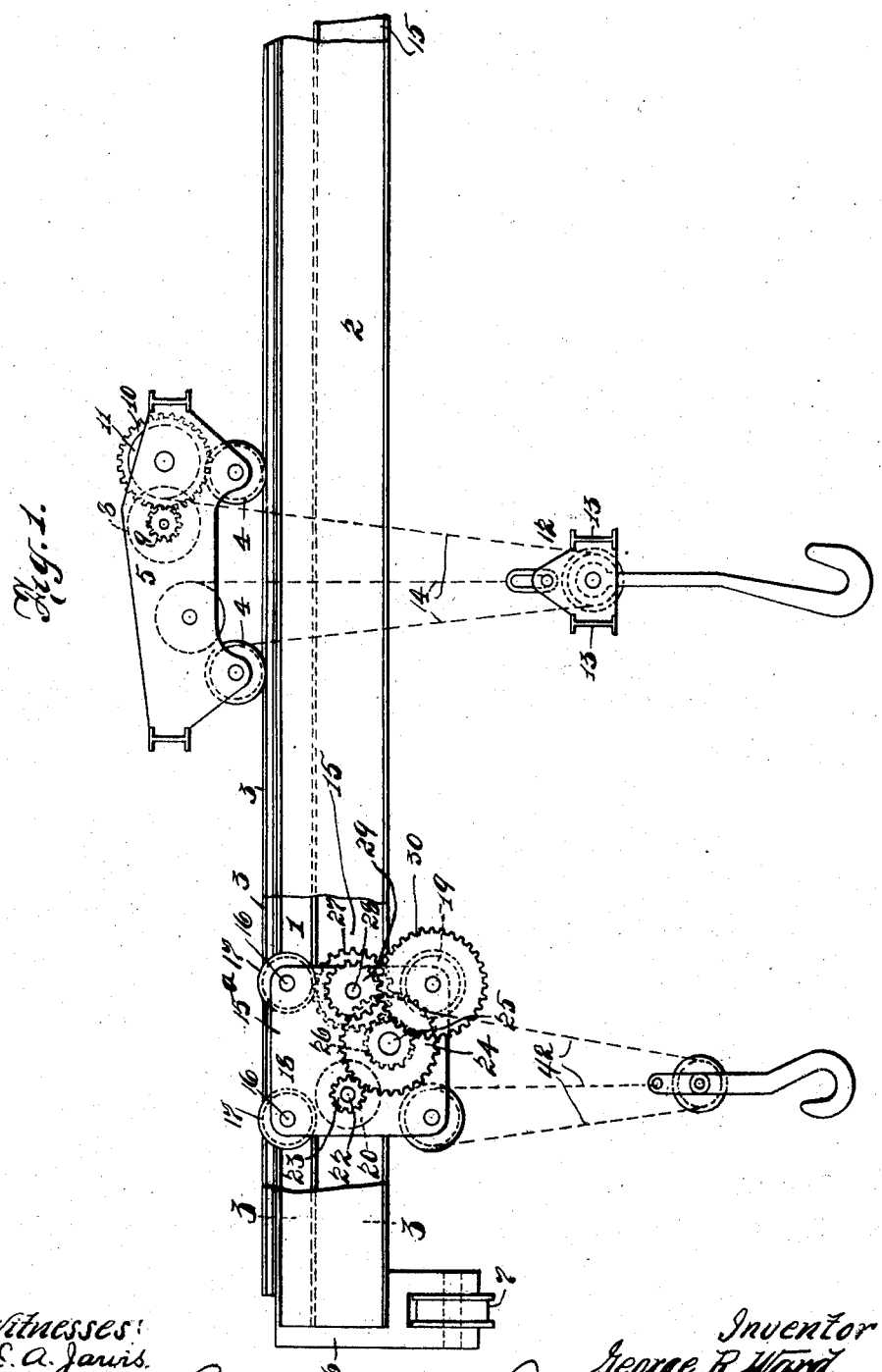
Figure 2:
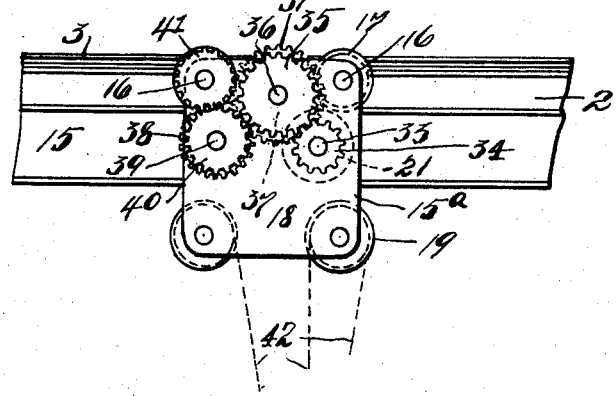
Figure 3:
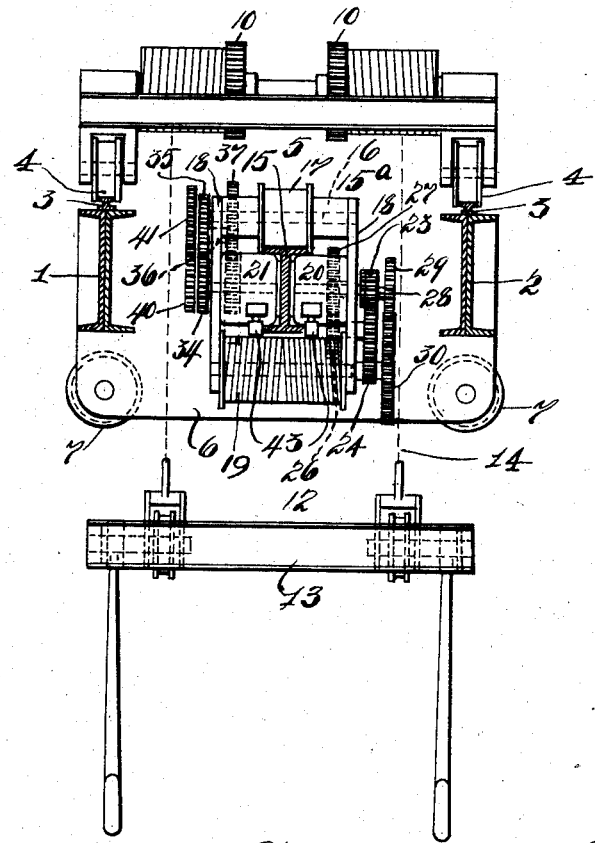

In the accompanying drawings, Figure 1 is a side elevation partly in section of a portion of a crane built according to my invention; Fig. 2 is a side elevation of the opposite side of the supplementary trolley from that shown in Fig. 1; and Fig. 3 is a section on line 3—3 Fig. 1.

As shown by the drawings, the main girders 1 and 2 form supports for the rails 3 on which the wheels 4 of the main trolley 5 run. The girders are supported at their ends in carriages 6 of ordinary construction provided with wheels 7 by means of which the entire structure may be moved back and forth through the foundry or workshop in the ordinary manner.

The main trolley 5 is provided with a motor 8 having gears 9 meshing with gears 10 of hoisting drums 11, which serve to operate the block and fall 12. In the drawing I have shown this as accomplished by means of a double block and fall connected by a transverse beam 13, but any type of such apparatus may obviously be used. In the construction shown the chains 14 for the block and fall pass between the main girders and they straddle the supplementary trolley and its independent girder, which will now be described.

The third or supplementary single girder 15 is supported at its ends independently of the main girders 1 and 2, but in the same end carriages 6 so as to move up and down the shop with the rest of the apparatus. The supplementary trolley 15$^a$, as viewed from the end, as in Fig. 3 is a rectangular structure having for its upper members the shafts 16 carrying the traction wheels 17. Depending side plates 18 connected to the shafts 16, carry the shafts for the various gears and hoisting drum 19. Motors 20 and 21 are also carried by the plates 18. Motor 20 for hoisting, as best shown in Fig. 1, is connected with the hoisting drum 19 as follows:—Motor shaft 22 carries outside the frame a gear 23, which meshes with a gear 24 also outside the frame and on a shaft 25. On the shaft 25 there is a gear 26 meshing with a gear 27 on a shaft 28, both gears being within the frame, that is, between the two depending plates. Shaft 28 carries a gear 29 outside the frame which meshes with gear 30 of the hoisting drum shaft 19.

For traversing the supplementary trolley on its beam or girder 15, gearing best illustrated in Fig. 2 may be used. The traversing motor 21 has a shaft 33 carrying a gear 34 meshing with a gear 35 on a shaft 36. Both gears 34 and 35 are outside of the frame. On the shaft 36 is a gear 37 meshing with a gear 38 on a shaft 39. Both gears 37 and 38 are between the plates. On shaft 39 outside the frame is a gear 40 meshing with a gear 41 of the shaft 16 for the traction wheel 17.

The chains 42 of the supplementary trolley hang preferably immediately below the traction wheels which as shown in Fig. 1 are arranged in tandem.

If desired steadying rollers 43 may be secured to the supplementary trolley to bear against the supplementary beam or girder to take any tendency of the supplementary trolley to sway sidewise.

What I claim is:

1. A crane having main girders, a main hoisting trolley thereon, a single supplementary girder, independent of the main girders and a supplementary trolley on said girder.

2. A crane having main girders, a main hoisting trolley thereon, a single supplementary girder, independent of the main girders and a supplementary trolley on said girder, said supplementary trolley having wheels in tandem resting on said supplementary girder.

3. A crane having main girders, a main hoisting trolley thereon, a single supplementary girder, independent of the main girders and a supplementary trolley on said girder, said supplementary trolley having wheels in tandem resting on said supplementary girder, a hoisting drum, and chains hanging vertically under said supplementary trolley.

4. A crane having main girders, a main hoisting trolley thereon, a single supplementary girder, independent of the main girders and a supplementary trolley on said girder, said supplementary trolley having wheels in tandem resting on said supplementary girder, a hoisting drum, and chains hanging vertically under said supplementary trolley, and chains for the main trolley hanging between the main girders.

5. A crane having main girders, a main hoisting trolley thereon, a single supplementary girder, independent of the main girders and a supplementary trolley on said girder, and chains for the main trolley hanging between the main girders.

6. A crane having main girders, a main hoisting trolley thereon, a single supplementary girder, independent of the main girders and a supplementary trolley on said girder, said supplementary trolley being composed of a rectangular frame, a trolley wheel shaft constituting its upper member from which depends arms carrying the hoisting apparatus.

Signed at New York city this 5th day of June 1907.

GEORGE R. WARD.

Witnesses:
 F. WARREN WRIGHT,
 BEATRICE MIRRIS.